United States Patent [19]

Hirotani et al.

[11] Patent Number: 5,576,650
[45] Date of Patent: Nov. 19, 1996

[54] RESET CIRCUIT OF ELECTRONIC DEVICE

[75] Inventors: Takayuki Hirotani, Yokohama; Takashi Orimoto, Akikawa; Kouji Moriya, Higashiyamato; Katsuyoshi Kaneko, Hamura; Kazuyoshi Watanabe, Tokyo, all of Japan

[73] Assignee: Casio Computer Co., Ltd., Tokyo, Japan

[21] Appl. No.: 420,300

[22] Filed: Apr. 11, 1995

[30] Foreign Application Priority Data

Apr. 25, 1994 [JP] Japan .................................. 6-110529

[51] Int. Cl.$^6$ ................................................. H03K 3/02
[52] U.S. Cl. ................................... 327/142; 327/198
[58] Field of Search .............................. 327/142.3, 261; 326/198, 51

[56] References Cited

U.S. PATENT DOCUMENTS

| | | | |
|---|---|---|---|
| 4,087,643 | 5/1978 | Joslow et al. | 179/15 AL |
| 4,091,455 | 5/1978 | Woods et al. | 364/200 |
| 4,313,158 | 1/1982 | Porter et al. | 364/200 |
| 5,203,000 | 4/1993 | Folkes et al. | 327/143 |
| 5,345,583 | 9/1994 | Davis | 395/575 |
| 5,438,279 | 8/1995 | Masumoto | 327/143 |

*Primary Examiner*—Margaret Rose Wambach
*Attorney, Agent, or Firm*—Frishauf, Holtz, Goodman, Langer & Chick

[57] ABSTRACT

A processor outputs a state signal representing the process state to a reset circuit. Upon reception of a reset signal from an external reset switch, the reset circuit outputs the reset signal to the reset terminal of the processor under the condition that the state signal allows a reset operation. The reset circuit also has a counter for starting a count operation upon reception of an externally input reset signal. Even when the processor is in a runaway state and cannot output the state signal for allowing the reset operation, a forced reset signal is supplied to the processor after a predetermined time is counted by the counter.

12 Claims, 7 Drawing Sheets

RESET CIRCUIT OF ELECTRONIC DEVICE

BACKGROUND OF THE INVENTION

1. Field of the Invention

The present invention relates to a reset circuit used in an electronic device and, more particularly, to a reset circuit for a processor such as a CPU (Central Processing Unit) and an MPU (Micro Processing Unit).

2. Description of the Related Art

A reset operation is denoted such that, for example, the Q outputs from all flip-flops such as registers and counters are set to a level "0" (i.e., "L"). In an arithmetic and logic processor such as a CPU and an MPU, the system is preferably set in a predetermined state upon a power ON operation, and therefore power-ON reset which uses a rise in a power supply voltage as a signal is often used.

Alternatively, by use of an external reset switch, the system is set again in the same state as that obtained after a power ON operation, or otherwise the arithmetic and logic processor is initialized.

For this reason, normally the above arithmetic and logic processor has a reset terminal or a clear terminal for initializing internal circuits. When a reset signal is supplied to the reset terminal, the internal circuits such as flip-flops are initialized.

Conventionally, for an arithmetic and logic processor (simply referred to as a processor hereinafter) such as a CPU and an MPU, there is provided:

1. a reset circuit for forcibly supplying a reset signal to the reset terminal of the processor, or 2. a reset circuit for supplying a reset signal to the reset terminal of the processor as an interrupt process when software processing is temporarily interrupted on the basis of software processing conditions and the like in the processor.

More specifically, in the above case 1, a reset signal (more specifically, a reset pulse) is generated in accordance with a reset signal request which is externally input. The reset signal generated is then output to the reset terminal of the processor, thereby initializing the internal units of the processor.

In the above case 2, the arithmetic processor is normally executing various processes based on predetermined programs. When the program processing is being executed, predetermined status information is output during a normal operation. Thus, if the program execution processing causes a runaway due to any reason and no more status information is output, it is determined that an abnormality has occurred in the program execution processing. At this time, a reset signal is output to the reset terminal of the processor as an interrupt signal, thereby performing initialization of the processor.

However, in a reset scheme stated in the above case 1, if a reset signal request is issued during an access to a memory such as a built-in RAM (Random Access Memory) by the processor, a reset signal is output to the reset terminal of the processor. For this reason, the following problem is occurs.

More specifically, in such a memory access state, information stored in the memory is being changed by a rewriting operation or the like, and the contents of the memory are not defined yet. Therefore, when the processor is reset in such an unstable state, there is the possibility that the contents of the memory are destroyed.

This is based on the same reason, for example, as that for inhibiting an eject operation during an access to a floppy disk (FD) in a floppy disk drive (FDD). If the process is resumed with the contents of the memory destroyed, an unexpected failure may occur.

In a reset scheme stated in the above case 2, when the program execution processing causes a runaway due to any reason and no more status information is output, it is determined that an abnormality has occurred in the program execution processing, and a reset signal is output to the reset terminal of the processor as an interrupt signal. For this reason, the following problem occurs.

More specifically, if a wait terminal or a bus hold terminal etc. are also locked due to the runaway of the processor, the status information is fixed as it is though the processor is in the runaway state. Therefore, the processor cannot be reset permanently.

SUMMARY OF THE INVENTION

It is an object of the present invention to provide a system to reset a processor in an electronic device firmly while protecting the contents of peripheral circuits.

In order to achieve the above object, according to an aspect of the present invention, there is provided an electronic device having a processor, a memory, and a reset circuit, wherein the processor has a reset terminal and outputs a process state (PS) signal representing at least a data write state to the memory, and wherein the reset circuit has a gate circuit controlled to be disabled when the PS signal represents the data write state, and a path for supplying an externally input reset signal to the reset terminal of the processor through the gate circuit.

According to another aspect of the present invention, there is provided a reset circuit for outputting a reset signal to a processor to initialize an operation of the processor, comprising: reset signal generation means for generating the reset signal; status detection means for detecting a particular state of process by the processor; and reset signal output control means for outputting the reset signal generated by the reset signal generation means to the processor under a condition that the status detection means detects the particular state of process by the processor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

There will now be described embodiments of the prevent invention with reference to the accompanying drawings.

First Embodiment

A reset circuit according to the first embodiment of the present invention will be described with reference to FIGS. 1 to 6 hereinbelow.

Figure 1:
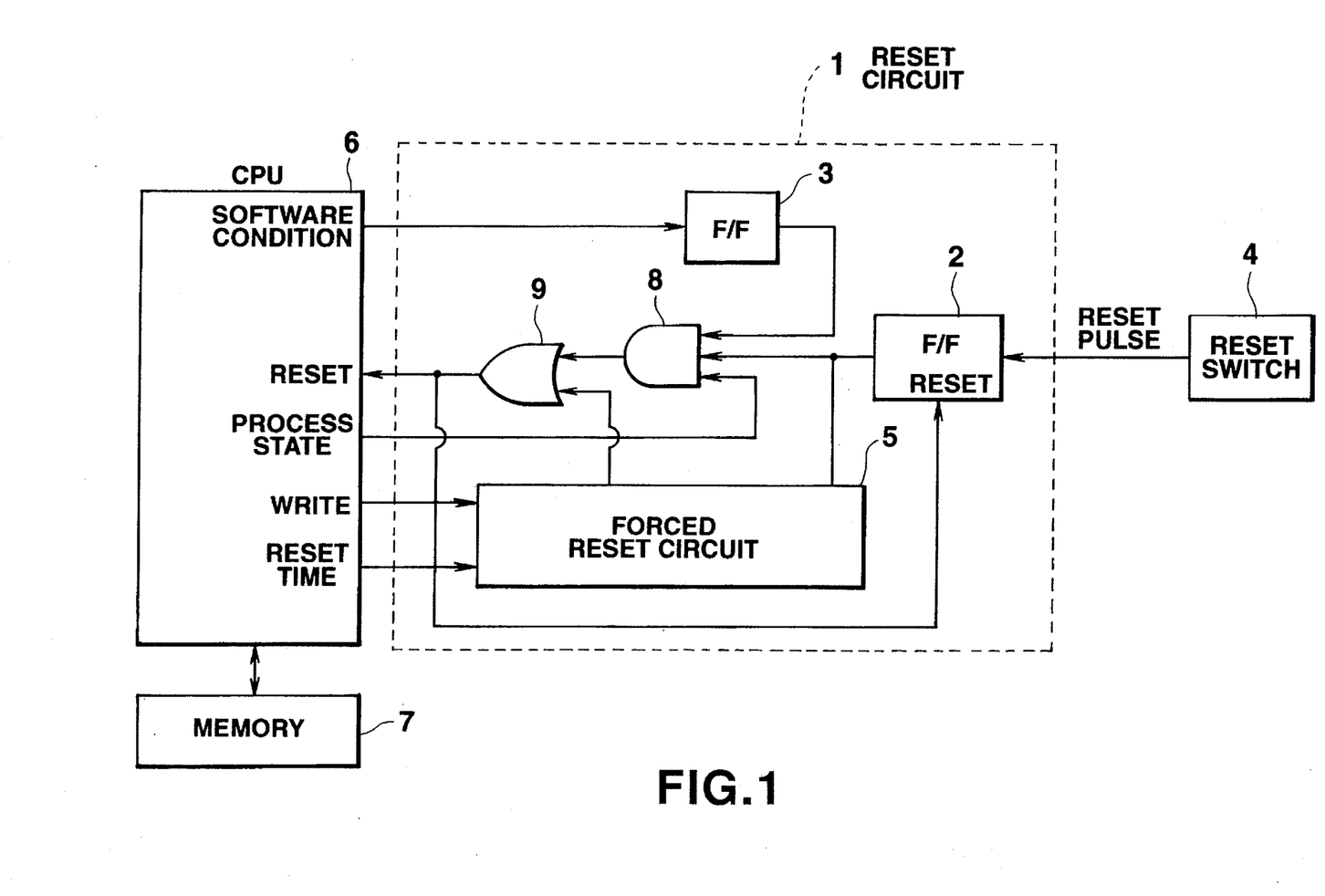
FIG. 1 is a block diagram showing the entire arrangement of a reset circuit according to the first embodiment of the present invention.

FIG. 1 is a block diagram showing the entire arrangement of an electronic device using a reset circuit 1 of the first embodiment.

Referring to FIG. 1, the reset circuit 1 of this embodiment comprises a flip-flop 2 for storing a reset pulse supplied from an external reset switch 4, a flip-flop 3 for storing a software condition signal supplied from a CPU 6, an AND gate 8, an OR gate 9, and a forced reset circuit 5. Reference numeral 7 denotes a memory as a peripheral circuit connected to the CPU 6 through a bus.

The flip-flop 2 latches the reset pulse generated upon depressing the external reset switch 4 and outputs the latched reset pulse to an input terminal of the AND gate 8 and the forced reset circuit 5. In addition, when the reset signal to be supplied to the reset terminal of the CPU 6 is supplied to the reset terminal of the flip-flop 2, the flip-flop 2 is reset simultaneously with the reset operation of the CPU 6.

The flip-flop 3 normally outputs a signal of a level "H". When the flip-flop 3 latches a reset inhibition condition signal output from the CPU 6 a specific software execution process, it outputs a signal of the level "L" to the input terminal of the AND gate 8. More specifically, as for specific software such as a character substitution program wherein data which is being written in a memory is destroyed upon a reset operation during execution, a reset inhibition condition set instruction is executed before execution of character substitution, thereby outputting a reset inhibition condition signal. Upon completion of character substitution, an inhibition cancel instruction is executed to clear the reset inhibition condition signal stored in the flip-flop 3, thereby returning an output from the flip-flop 3 to the level "H". An output signal from the flip-flop 3 is referred to as a software condition signal hereinafter.

The output terminal of the flip-flop 2, the output terminal of the flip-flop 3, and the output terminal of a signal (to be referred to as a PS signal hereinafter) representing an access state (process state) of the CPU 6 are connected to the input terminals of the AND gate 8, respectively. The output terminal of the AND gate 8 is connected to one input terminal of the OR gate 9. The PS signal (to be described later in detail) is a signal representing the state wherein the CPU 6 accesses the memory 7.

The output terminal of the AND gate 8 is connected to one input terminal of the OR gate 9. The other input terminal of the OR gate 9 is connected to the output terminal of the forced reset circuit 5.

More specifically, in this circuit, when both a PS signal output from the CPU 6 and a software condition signal from the flip-flop 3 are at the level "H", and at the same time, a reset pulse is input from the flip-flop 2, or when a reset pulse is output from the forced reset circuit 5, a reset signal is output from the OR gate 9 to the CPU 6.

Figure 2:
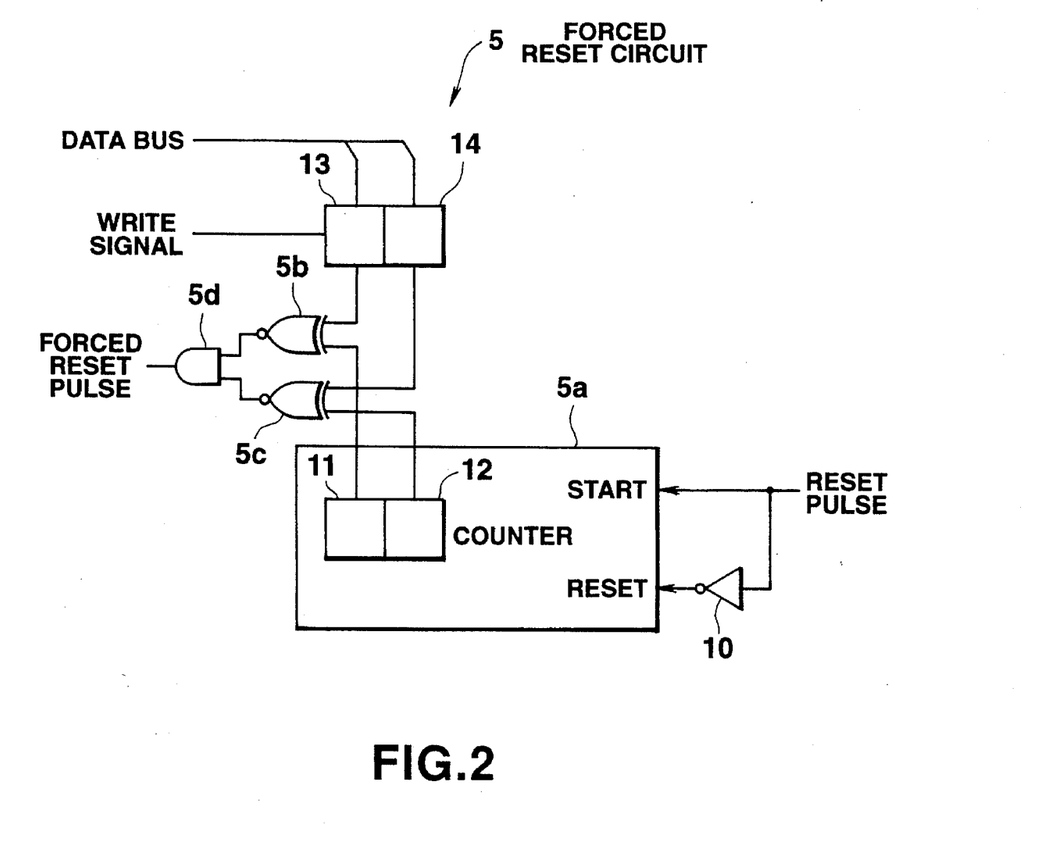
FIG. 2 is a block diagram showing the arrangement of the main portions of a forced reset circuit.

FIG. 2 is a block diagram showing the configuration of the forced reset circuit 5. The forced reset circuit 5 comprises a counter 5a serving as a counter circuit, exclusive NOR gates 5b and 5c, an AND gate 5d, an inverter 10, and registers 11 to 14. The forced reset circuit 5 is so constituted that it outputs a reset signal after the elapse of a predetermined time from reception of a reset pulse from the flip-flop 2.

The output terminal of the flip-flop 2 is connected to a start terminal as an input terminal of counter 5a. The output terminal of the flip-flop 2 is connected to the reset terminal through the inverter 10. The registers 11 and 12 hold two-digit second figures on the basis of the count value of the counter 5a. The contents of the registers 11 and 12 are connected to the corresponding input terminals of the exclusive NOR gates 5b and 5c, respectively.

The registers 13 and 14 are connected to the other input terminals of the exclusive NOR gates 5b and 5c, respectively. The registers 13 and 14 latch forced reset time data output from the CPU 6 through a data bus in accordance with a write signal (to be referred to as a WR signal hereinafter). The contents of the registers 13 and 14 are compared with those of the registers 11 and 12 by the exclusive NOR gates 5b and 5c. In this case, the forced reset time is defined as two-digit second figures and can be freely set within a range of 1 to 99 seconds. That is, an arbitrary time can be set in seconds, and five seconds are set in the first embodiment.

More specifically, when a reset pulse is input from the flip-flop 2, the reset pulse is directly supplied to the start terminal of the counter 5a, and at the same time, the reset pulse is supplied to the reset terminal through the inverter 10, thereby starting a count operation by the counter 5a.

During the count operation of the counter 5a, elapsed seconds are stored in the registers 11 and 12 in accordance with the count value. The second figures stored in the registers 11 and 12 are compared with a set value as a forced reset time, which is stored in the registers 13 and 14 in advance in accordance with a WR signal from the CPU 6, by the exclusive NOR gates 5b and 5c. If these values are coincided with each other, signals of the level "H" are output from the exclusive NOR gates 5b and 5c. As a result, a forced reset pulse is output from the AND gate 5d.

Figure 3:
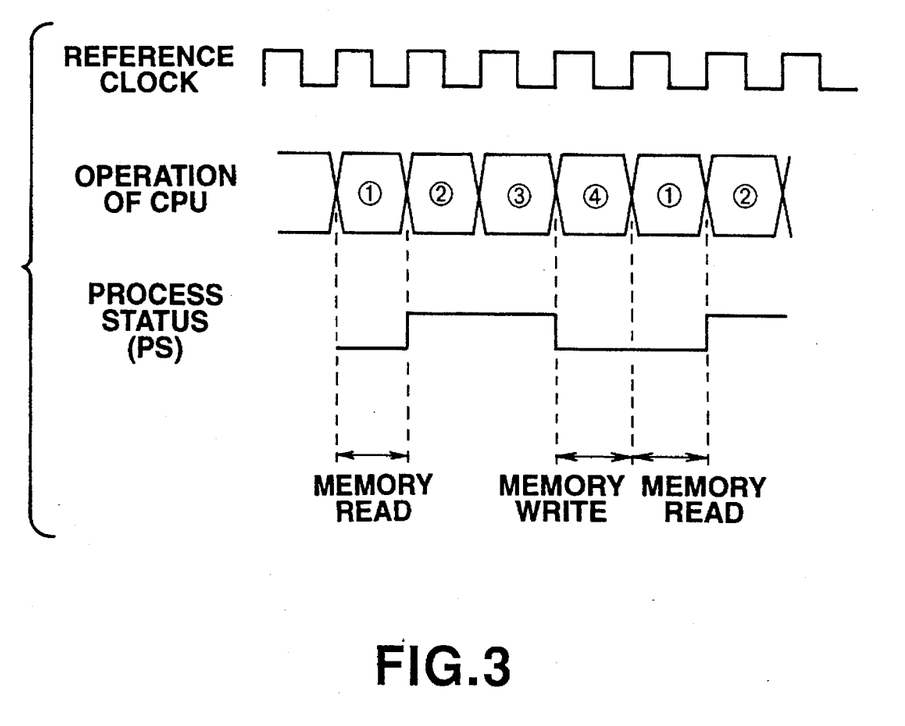
FIG. 3 is a timing chart of a PS signal representing a memory access state of a CPU.

FIG. 3 is a timing chart of a PS signal representing the access state of the CPU 6 to the memory 7. The CPU 6 executes, on the basis of a reference clock, a series of processes such as ① fetch of an instruction, ② decode of an instruction, ③ execution of an instruction, and ④ transmission of data (storage of data) to the memory 7.

In the first embodiment, a PS signal is output from the CPU 6 while an access to the memory 7 using the bus is not performed. Therefore, in the process of ① fetch of an instruction or ④ storage of data, which is performed for a read/write access to the memory 7, a signal of the level "L" is output as the PS signal. In the process of ② decode of an instruction or ③ execution of an instruction is an internal process of the CPU 6, which does not require an access to the memory 7, a signal of the level "H" is output as the PS signal.

The operations of the reset circuit 1 shown in FIG. 1 will now be described hereinbelow with reference to FIGS. 4 to 6.

Figure 4:
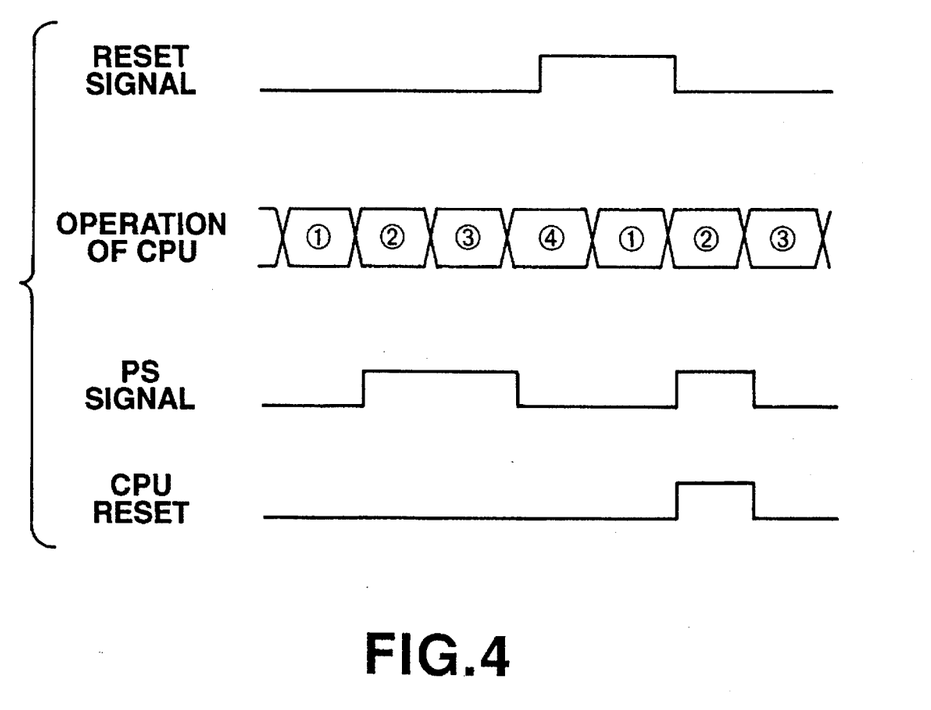
FIG. 4 is a timing chart for explaining a process state reset operation of the reset circuit.

Reset Control by Process State (FIG. 4)

When the CPU 6 is executing decode and execution of an instruction while the software does not inhibit the reset operation, both the software condition signal and the PS signal supplied to the AND gate 8 are at the level "H". When a reset pulse is supplied to the flip-flop 2 at this timing by an external operation, the reset pulse from the flip-flop 2 passes through the AND gate 8 and is immediately supplied to the reset terminal of the CPU 6 through the OR gate 9. Therefore, the CPU 6 immediately starts the reset operation in accordance with the reset operation.

On the other hand, when the CPU 6 is executing fetch of an instruction or storage of data while the software does not inhibit the reset operation, a software condition signal of the level "H" and the PS signal of the level "L" are supplied from the flip-flop 3 to the AND gate 8. Therefore, when a reset pulse is received from the flip-flop 2 at this timing, an output from the AND gate 8 is at the level "H", so no reset signal is output from the OR gate 9. When the CPU 6 continues its operation, and the PS signal goes "H", a reset signal is output from the OR gate 9. At this time, the forced reset circuit 5 performs a count operation upon reception of the reset pulse. However, since the PS signal goes "H" within a short time, the counter 5a is reset before a forced reset signal is output.

Figure 5:
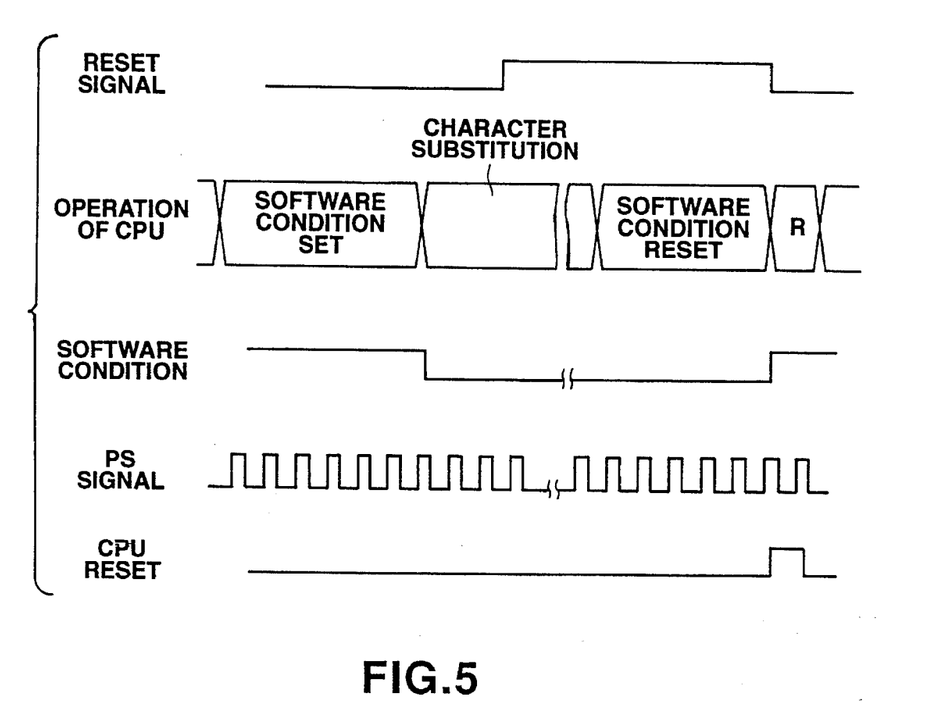
FIG. 5 is a timing chart for explaining the software condition reset operation of the reset circuit.

Reset Control by Software (FIG. 5)

FIG. 5 is a timing chart for explaining a reset operation of the reset circuit 1 under the control of software.

When a reset pulse is supplied to the flip-flop 2 by operating the external switch, the reset pulse is latched by the flip-flop 2. The latched reset pulse is supplied from the flip-flop 2 to the AND gate 8 and the forced reset circuit 5. With this operation, a count operation is started by the counter 5a in the forced reset circuit 5.

On the other hand, a software condition signal is supplied from the flip-flop 3 to the AND gate 8. The software condition signal goes "L" when software processing involving a memory access is executed by the CPU 6. For example, before the character substitution process is executed by document creation software of a wordprocessor or the like, the CPU 6 outputs the reset inhibition condition signal, and the flip-flop 3 sets the software condition signal at a level "L".

With this process, when a reset pulse is output from the flip-flop 2 during the character substitution processing by the CPU 6, the software condition signal from the flip-flop 3 goes "L". Therefore, even when the PS signal supplied to the AND gate 8 goes "H", no reset signal is output from the OR gate 9. When the software condition (reset inhibition condition) is canceled upon completion of the software processing (i.e., "H"), and the PS signal goes "H", a reset signal is output to cause the CPU 6 to perform the reset operation.

Figure 6:
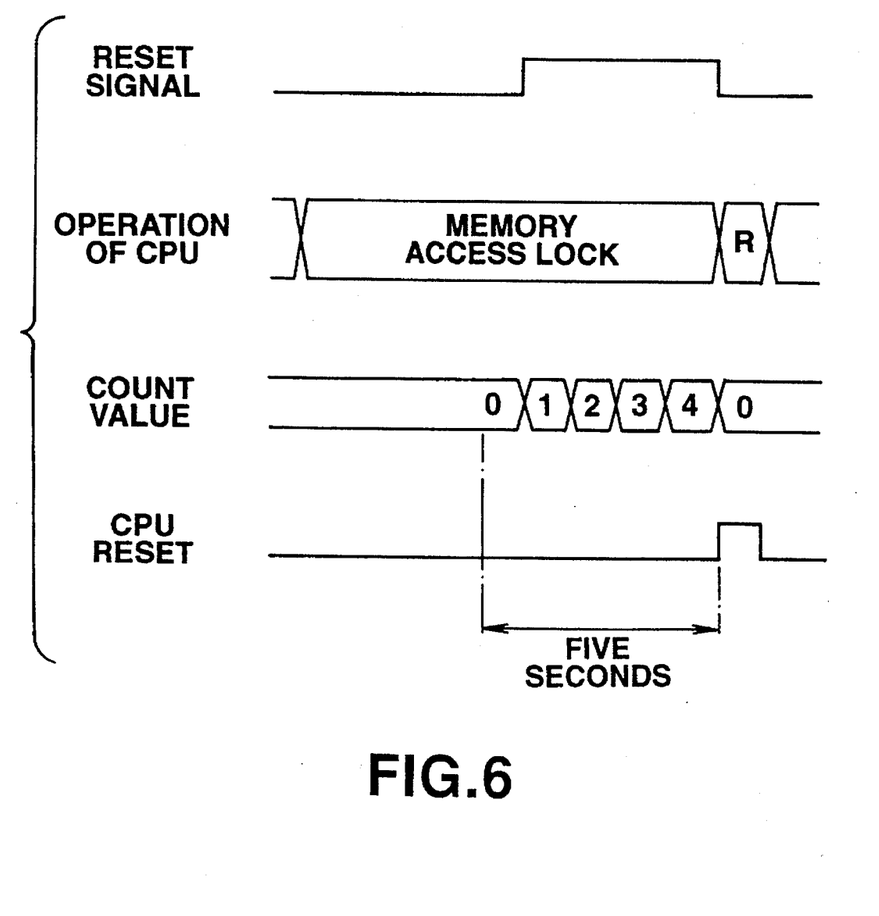
FIG. 6 is a timing chart for explaining a forced reset operation in a runaway state of the reset circuit.

Forced Reset Operation (FIG. 6)

FIG. 6 is a timing chart for explaining a forced reset operation in the runaway state of the CPU 6.

Assume that runaway of the CPU 6 occurs during execution of software processing, e.g., that the CPU 6 is locked during an access to the memory 7, since the access state of the CPU 6 to the memory 7 is maintained, the PS signal is kept at the level "L". Therefore, even when a reset pulse is supplied to the flip-flop 2 by an external operation and the reset pulse is output from the flip-flop 2, the reset pulse cannot be output from the AND gate 8 to the OR gate 9 in this state because the PS signal is at the level "L".

However, a count operation by the counter 5a in the forced reset circuit 5 is started simultaneously with output of the reset pulse from the flip-flop 2. Upon reaching a predetermined count value (five seconds in this case), a forced reset pulse is output to the OR gate 9, thereby forcibly resetting the CPU 6.

In the above first embodiment, the PS signal output from the CPU 6 goes "H" because the memory 7 is not accessed in the process of ② decode of an instruction or ③ execution of an instruction. However, the arrangement is not limited to this configuration. Since only reading of an instruction from the memory 7 is performed in the process of ① fetch of an instruction, a signal of the level "H" may also be output as the PS signal in the process of ① fetch of an instruction.

In the above embodiment, the CPU 6 is exemplified as a calculation means. However, the calculation means for receiving a reset signal is not limited to the CPU 6.

Second Embodiment

Similarly, the arrangement of the forced reset circuit 5 is not limited to the above arrangement. For example, as shown in FIG. 7, it may be replaced with another arrangement having the same function, as a matter of course.

Figure 7:
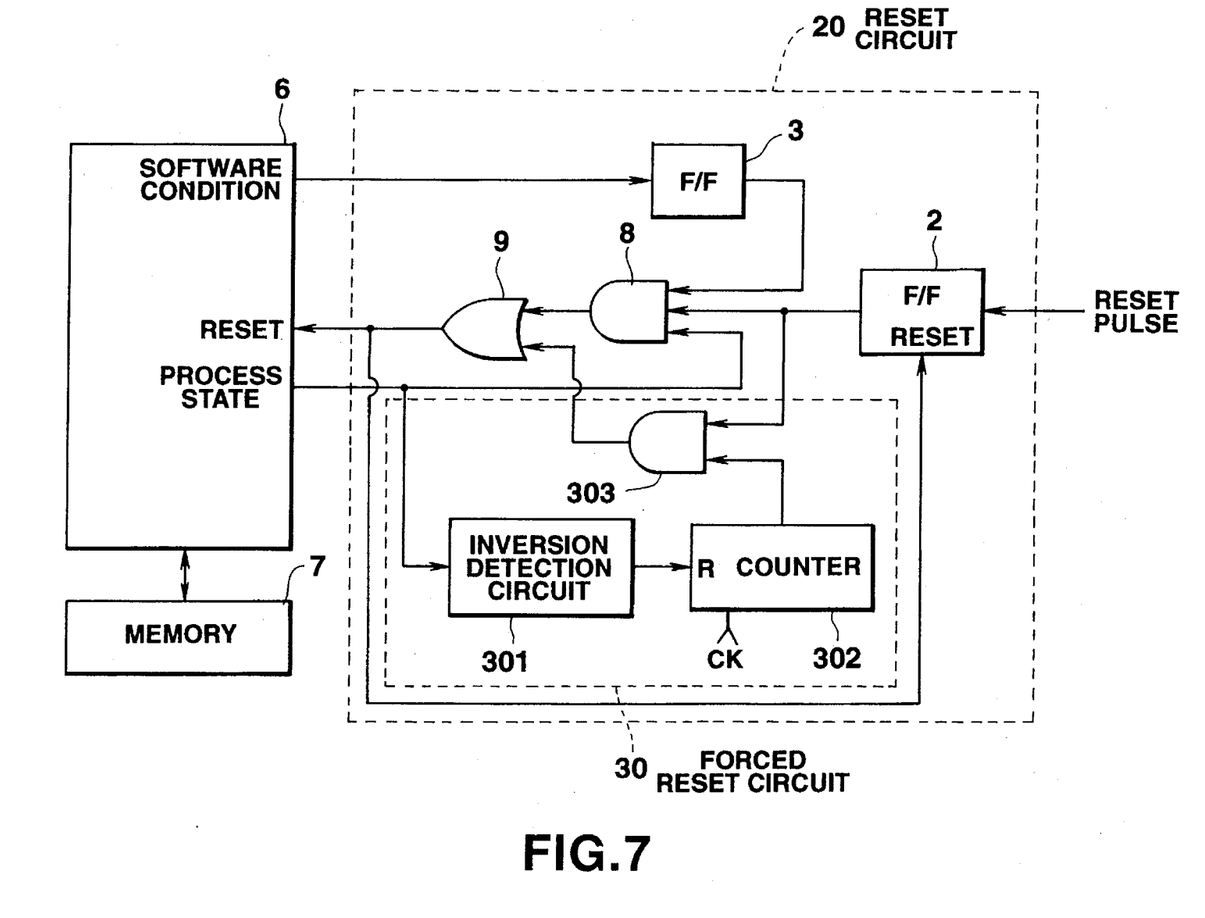
FIG. 7 is a block diagram showing the entire arrangement of a reset circuit according to the second embodiment of the present invention.

FIG. 7 is a block diagram showing the entire arrangement of a reset circuit 20 according to the second embodiment. The same reference numerals as used in FIG. 1 denote the same elements in FIG. 7.

Referring to FIG. 7, a forced reset circuit 30 in the reset circuit 20 comprises an inversion detection circuit 301, a counter 302, and an AND gate 303.

The inversion detection circuit 301 outputs a reset signal to the reset terminal of the counter 302 when the process state (PS signal) changes. The counter 302 is reset in accordance with the reset signal output from the inversion detection circuit 301 and counts a clock CK input from the input terminal. When the count value reaches a predetermined value (e.g., five seconds), a signal of the level "H" is output to one of the input terminals of the AND gate 303.

One input terminal of the AND gate 303 is connected to the output terminal of the counter 302, as described above. The other input terminal of the AND gate 303 is connected to the output terminal of a flip-flop 2, and its output terminal is connected to one input terminal of an OR gate 9.

During a normal operation, the PS signal output from a CPU 6 is alternately inverted as "H"→"L"→"H"→..., and output. Therefore, if the PS signal is not inverted during a predetermined time, it indicates the runaway state of the CPU 6.

More specifically, in a normal state, a reset signal is supplied from the inversion detection circuit 301 before the counter 302 counts up, and a reset operation is performed. However, when the CPU 6 is in the runaway state, no reset signal is supplied from the inversion detection circuit 301, and a count up signal is output to the AND gate 303. At this time, when a reset pulse is supplied from the flip-flop 2 to the AND gate 303, a forced reset signal is output from the AND gate 303 to the OR gate 9, and a reset signal is output from the OR gate 9 to the reset terminal of the CPU 6.

Therefore, as in the above second embodiment, a forced reset operation is performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic device having a reset circuit, the electronic device comprising:

a memory;

a processor having a reset terminal and a process state (PS) terminal for outputting a PS signal representing at least a data write state to said memory;

a reset switch; and a reset circuit including a condition storage circuit and a gate circuit for controlling to pass a reset signal from said reset switch to said reset terminal of said processor, wherein said processor causes said condition storage circuit to store reset inhibition data for inhibiting a reset operation before a predetermined program is executed, and said gate circuit is controlled by said processor so as to be disabled, to prevent passing of the reset signal, when the PS signal represents the data write state and when said condition storage circuit stores the reset inhibition data.

2. A device according to claim 1, wherein the PS signal is output from said processor while a data read/write access to said memory is carried out through a bus.

3. A device according to claim 2, further comprising a forced reset circuit for supplying a delayed reset signal which is different from the reset signal applied to said reset terminal of said processor via said gate circuit, said delayed reset signal being supplied when a predetermined time period has elapsed without an output of the PS signal after reception of the reset signal which is input from said reset switch via said gate circuit.

4. A device according to claim 3, wherein said forced reset circuit includes a timer circuit which sets a delay time of said delayed reset signal.

5. A device according to claim 1, further comprising a forced reset circuit for supplying a substitute reset signal which is different from the reset signal which is applied to said reset terminal of said processor via said gate circuit when a predetermined time period has elapsed without an output of the reset signal from said gate circuit after reception of a reset signal input from said reset switch.

6. A device according to claim 5, wherein said forced reset circuit includes a timer circuit which sets a delay time of said substitute reset signal.

7. A reset circuit for outputting a reset signal to a processor to initialize an operation of said processor, the reset circuit comprising:

reset signal generation means for generating the reset signal;

status detection means for detecting a particular state of a process being conducted by said processor;

condition storage means for storing condition data for inhibiting a reset operation of said processor when a predetermined program is to be executed by said processor; and reset signal output control means including a gate circuit for outputting the reset signal generated by said reset signal generation means to said processor when said status detection means detects said particular state of a process being conducted by said processor and when said condition storage means does not store said condition data for inhibiting a reset operation.

8. A circuit according to claim 7, wherein said status detection means includes means for detecting said particular state in accordance with a state signal which is output by said processor on the basis of a processing operation of said processor, the state signal representing whether a memory access is being made.

9. A circuit according to claim 8, further comprising:

count means for starting a count operation upon generation of the reset signal by said reset signal generation means and for resetting the count operation when said reset signal output control means outputs the reset signal; and forced reset means for outputting a forced reset signal when said count means counts a predetermined time.

10. A circuit according to claim 9, wherein the time to be counted by said count means is freely settable.

11. A circuit according to claim 7, further comprising:

count means for starting a count operation upon generation of the reset signal by said reset signal generation means; and forced reset means for outputting a forced reset signal when a predetermined time is counted by said count means without an output of the reset signal from said reset signal output control means.

12. A circuit according to claim 11, wherein the time to be counted by said count means is freely settable.

* * * * *

UNITED STATES PATENT AND TRADEMARK OFFICE
CERTIFICATE OF CORRECTION

PATENT NO. : 5,576,650

DATED : November 19, 1996

INVENTOR(S) : HIROTANI et al.

It is certified that error appears in the above-indentified patent and that said Letters Patent is hereby corrected as shown below:

```
Title page, Item [57] ABSTRACT,
         line 2, "toga" should be --to a--
```

Signed and Sealed this

Twenty-seventh Day of May, 1997

Attest:

BRUCE LEHMAN

Attesting Officer     Commissioner of Patents and Trademarks